United States Patent [19]

Ito

[11] 3,862,465
[45] Jan. 28, 1975

[54] WINDSHIELD WIPER BLADE

[76] Inventor: Isao Ito, 8-119, Kamezakitakane-cho, Handa-shi, Aichi-ken, Japan

[22] Filed: Apr. 24, 1973

[21] Appl. No.: 354,113

[30] Foreign Application Priority Data
May 4, 1972 Japan.............................. 47-52656

[52] U.S. Cl. ........................................... 15/250.42
[51] Int. Cl. ............................................... B60s 1/38
[58] Field of Search........ 15/250.36, 250.32, 250.42

[56] References Cited
UNITED STATES PATENTS

| | | | |
|---|---|---|---|
| 2,814,820 | 12/1957 | Elliot et al. ...................... | 15/250.36 |
| 3,037,233 | 6/1962 | Peras et al. ...................... | 15/250.42 |
| 3,673,631 | 7/1972 | Yamadai et al................... | 15/250.42 |

Primary Examiner—Peter Feldman
Attorney, Agent, or Firm—Cushman, Darby & Darby

[57] ABSTRACT

A connecting member (or members) for holding a windshield wiper blade member is formed to have a generally L-shape cross section comprising a short side and a long side, the free end of which is bent in a U-form for reinforcing the connecting member and for lowering air flow passing below it thereby to lessen lifting force acting on the wind shield wiper blade assembly when a vehicle is being driven in a high speed.

3 Claims, 5 Drawing Figures

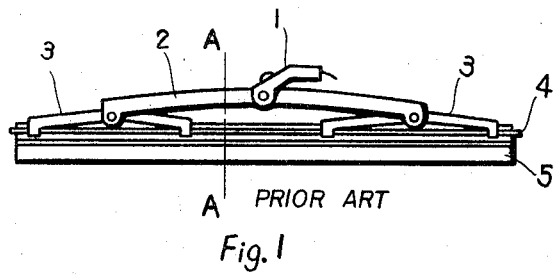
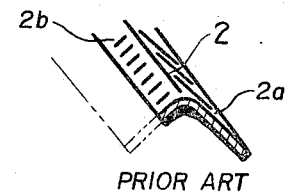
Fig. 1 PRIOR ART
Fig. 2 PRIOR ART
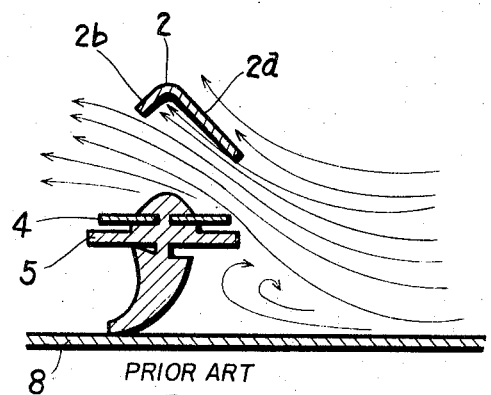
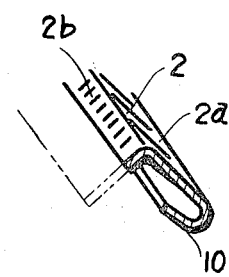
Fig. 3 PRIOR ART
Fig. 4
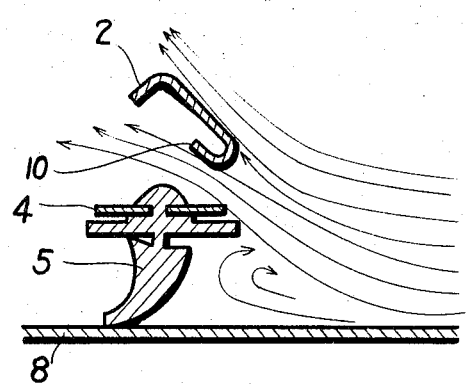
Fig. 5

WINDSHIELD WIPER BLADE

BACKGROUND OF THE INVENTION

The present invention relates generally to an improvement of a windshield wiper blade and more particularly to an improvement of a first and second connecting members. It is generally noted that when a vehicle is driven at a high speed, air passing through underneath the connecting members tends to lift the windshield wiper blade from a windshield. In order to lessen the lifting force, it has been known to employ a L shape cross section connecting member comprising short and long sides. The pressurized air underneath the L shape member can partially escape from the short side of the member, thus lessening the lifting force. However, it has been of a great problem that rigidity of the connecting members is not sufficient to maintain the mechanical strength of the blade due to the short side of the L cross section of the connecting members.

Now the prior art windshield wiper blade will be described in brief in order to distinctly point out the defects thereof which the present invention contemplates to overcome. Referring to FIG. 1, a first connecting member 2 is pivotally connected to a clip member 1, and a pair of second connecting members 3 are also pivotally connected to the first connecting member 2 at their ends. Both ends of the second connecting member 3 are bent in the form of a pawl in order to longitudinally slidably retain a spring member 4 which is fixed to a blade member 5. Thus the pressure of a wiper arm (not shown) can be uniformly distributed over the whole length of the blade member 5 in good contact with the windshield.

FIG. 2 shows a fragmentary sectional view of a conventional first connecting member which comprises a short side 2b and a long side 2a, thus forming a L shape cross section. In FIG. 3 showing air passing through underneath the first connecting member 2, a numeral 8 designates a windshield. It can be seen that the pressurized air underneath the L shape member can partially escape from the short side 2b of the connecting member thereby lessening the lifting force. While the conventional L shaped connecting member succeeds to lessen the lifting force, the mechanical strength is sacrificed as pointed out before. The present invention intends to provide an improved connecting member which further lessens the lifting force without sacrificing the mechanical strength.

SUMMARY OF THE INVENTION

It is an object of the present invention to provide a windshield wiper blade which is not lifted from a windshield even at a high speed driving of a vehicle and has a sufficient mechanical strength as well.

The present invention will become more apparent from the following description of an embodiment thereof taken in conjection with the accompaning drawings.

BRIEF DESCRIPTION OF THE DRAWINGS

FIG. 1 is a front view of the windshield wiper blade, showing all the parts assembled.

FIG. 2 is a perspective fragmentary sectional view on an enlarged scale of the conventional connecting member.

FIG. 3 is a sectional view on an enlarged scale of the conventional windshield wiper taken along the line A—A of FIG. 1.

FIG. 4 is a perspective fragmentary sectional view of an enlarged scale of the connecting member of the present invention.

FIG. 5 is a sectional view on an enlarged scale of the present invention taken along the line A—A of FIG. 1.

DESCRIPTION OF THE PREFERRED EMBODIMENT

Referring now to FIG. 4 showing the preferred embodiment of the present invention, the first connecting member 2 includes a short side 2b and a long side 2a. The end portion of the short side 2a is bent in a U shape portion 10 as clearly shown in the drawings. The U shape portion 10 extends longitudinally along the entire length of the second connecting member except for the connecting points to other members. FIG. 5 shows the cross section similar to FIG. 3 and illustrates schematically flow of the air around and underneath the second connecting member 2. It is appreciated that the U shape portion 10 serves to direct the air flow to a lower position compared with the situation shown in FIG. 3, thus letting almost the whole air flow escape below the connecting member without permitting it to lift the blade assembly. At the same time the U shape portion serves to reinforce the mechanical strength or rigidity of the first connecting member 2. While the drawings show only the first connecting member 2 provided with the U shape portion 10, the same may, of course, be applied to the second connecting members 3 as well. It is also possible to form the U shape portion only on the second connecting members 3.

What I claim is:

1. A windshield wiper comprising a blade assembly and connecting member attached to said blade assembly and having a short side and a long side in the transverse cross section to its longitudinal direction the long side of said member terminating at one end in a U-shaped bent portion bent in the same direction as the short side extends with the flat portions of said long side extending in parallel planes and the curved portion joining said flat portions substantially deflecting air impinging thereon so as not to impinge on said short side and not to lift said blade assembly.

2. A windshield wiper blade assembly comprising;
   a first connecting member,
   a pair of second connecting members each one of which is pivotally connected to each end of said first connecting member,
   a blade member longitudinally slidably held by said pair of second connecting members,
   said first connecting member having a generally L-shaped cross section comprising short side and a long side, the edge of said long side remote from said short side being bent in a U-form with the flat portions thereof extending in parallel planes and the bending being in the same direction that the short side extends for reinforcing the mechanical strength of said first connecting member and for directing air flow passing underneath the same to substantially prevent air impinging on said short side.

3. A windshield wiper assembly as in claim 2 wherein said second connecting members have a generally L-shaped cross section comprising a short and a long side, the free end of said long side being bent in a U-form for reinforcing mechanical strength of said second connecting member and for directing air flow passing below the same.

* * * * *